No. 830,143. PATENTED SEPT. 4, 1906.
C. L. FERRIOTT.
INSECT EXTERMINATOR.
APPLICATION FILED JUNE 15, 1905.
2 SHEETS—SHEET 1.
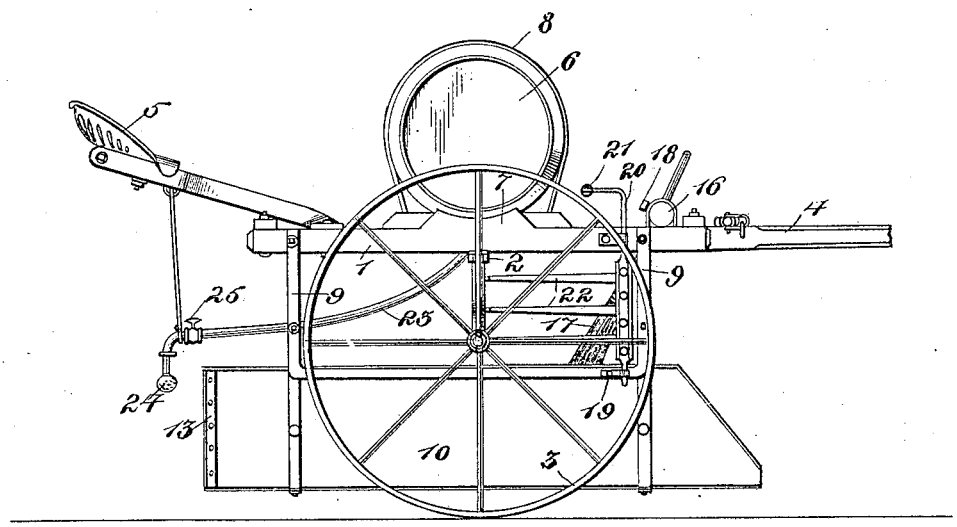
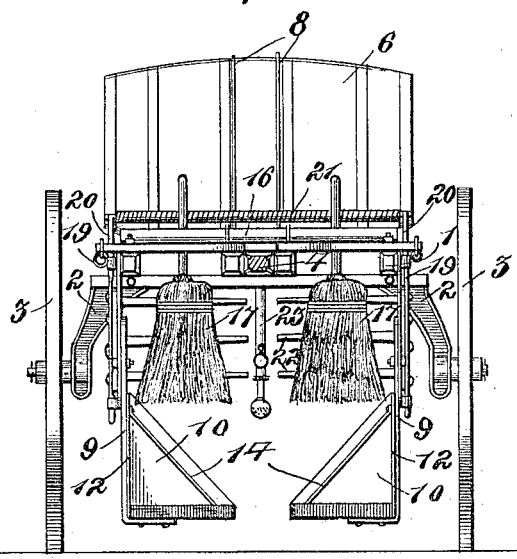
Witnesses
Forrest G. Smith
C. H. Griesbauer
Inventor
C. L. Ferriott
by H. B. Wilson
Attorney No. 830,143. PATENTED SEPT. 4, 1906.
C. L. FERRIOTT.
INSECT EXTERMINATOR.
APPLICATION FILED JUNE 15, 1905.
2 SHEETS—SHEET 2.
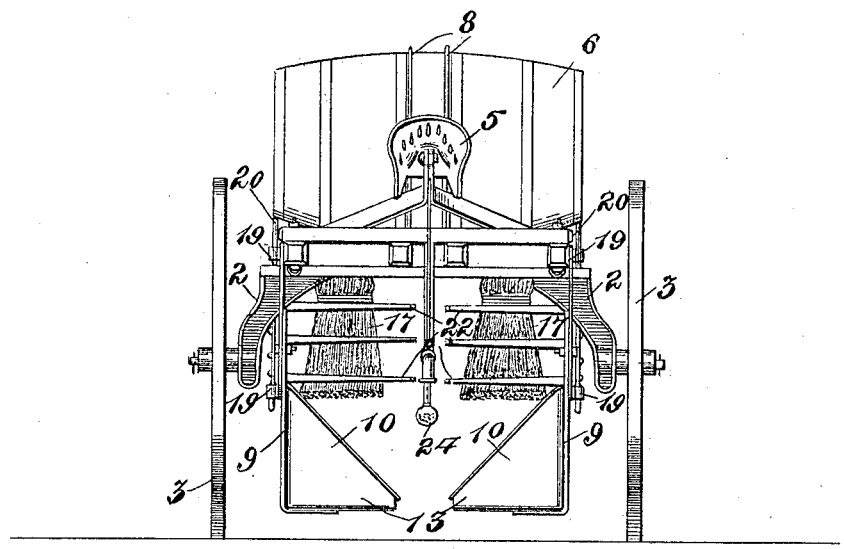
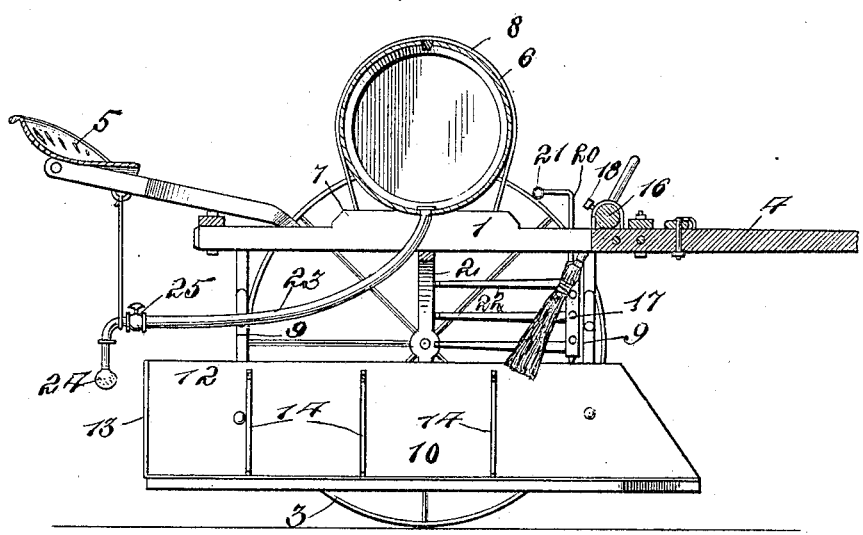
Witnesses
Forrest Smith
C. H. Griesbauer
Inventor
C. L. Ferriott
by H. B. Wilson
Attorney

UNITED STATES PATENT OFFICE.

CHARLES L. FERRIOTT, OF TAYLOR, TEXAS, ASSIGNOR TO MALCOLM H. LOGAN, OF TAYLOR, TEXAS.

INSECT-EXTERMINATOR.

No. 830,143.  Specification of Letters Patent.  Patented Sept. 4, 1906.

Application filed June 15, 1905. Serial No. 265,366.

*To all whom it may concern:*

Be it known that I, CHARLES L. FERRIOTT, a citizen of the United States, residing at Taylor, in the county of Williamson and State of Texas, have invented certain new and useful Improvements in Insect-Exterminators; and I do declare the following to be a full, clear, and exact description of the invention, such as will enable others skilled in the art to which it appertains to make and use the same.

This invention relates to improvements in insect-exterminators.

The object of the invention is to provide a device which may be drawn over the plants to remove the insects from the same, means being provided for catching the insects that have been dislodged by the machine, and means whereby the plants will be sprayed with a suitable solution after the insects have been removed therefrom.

A further object is to provide a machine of this character which will be simple, strong, and durable in construction, efficient in operation, and well-adapted to the purpose for which it is intended.

With these and other objects in view the invention consists of certain novel features of construction, combination, and arrangement of parts, as will be hereinafter described and claimed.

In the accompanying drawings, Figure 1 is a side elevation of an insect-exterminator constructed in accordance with the invention. Fig. 2 is a front end elevation. Fig. 3 is a rear end elevation, and Fig. 4 is a central vertical longitudinal sectional view of the same.

Referring more particularly to the drawings, 1 denotes a supporting-frame mounted upon an arched axle 2, on which is journaled supporting-wheels 3. The frame 1 is provided with a tongue or other suitable draft device 4 and a driver's seat 5. Secured upon the central part of the frame 1 is a tank or receptacle 6 to contain a poisonous solution, said tank or receptacle being here shown as a barrel laid upon its side on suitable supporting-blocks 7 and held in place by means of straps 8, which are passed around the barrel and secured to the frame 1, as shown.

Supported beneath the frame 1 and between the wheels 3 by means of depending hangers or brackets 9 are insect-receiving pans 10, said pans being here shown as in the form of oblong trays arranged longitudinally in parallel relation with each other and are spaced apart a sufficient distance to permit the rows of plants to pass between the same. The outer sides of the pans are formed considerably higher than the inner sides thereof, as shown at 12, the rear ends of the same being covered by triangularly-shaped end pieces 13. At the forward end of the machine the pans or trays 10 are formed at an angle, thus providing a flaring entrance to the passage between the pans which will gather in and guide the branches of the plants between said pans. The bottoms and the outer sides of the pans or trays 10 are connected and braced by inclined brace-bars 14.

On the upper side of the forward end of the frame 1 is arranged a transversely-disposed bar 16, in which holes are formed to accommodate the handles of the brooms or brushes 17. Said handles are adjustably secured in holes in the bar 16 by means of set-screws 18, thereby permitting the brooms to be raised or lowered as desired.

Journaled in brackets 19 secured to the forward outside ends of the frame 1 are vertically-disposed crank-shafts 20, the upper cranked ends of which project above the frame 1 and are connected together by means of a coil-spring 21. Secured to the crank-shafts 20 in any suitable manner are laterally-projecting horizontally-disposed beater arms or fingers 22, which are forced inwardly toward the center of the machine and yieldingly held in position by means of the coil-spring 21, connected to the upper cranked ends of the shaft 20. The normal position of the fingers 22 is diagonal to the frame, or said fingers extend backwardly and inwardly behind the brushes 17.

Connected to the lower side of the tank or receptacle 6 is secured the upper end of a flexible hose-pipe 23, on the lower end of which is arranged a spray-nozzle 24. A cut-off valve 25 is arranged in the pipe, whereby the flow of liquid from the tank or receptacle 6 may be controlled.

In operation as the machine is drawn over the plants the brushes or brooms 17 will be engaged with the plants, thereby knocking the insects off of the same into the pans or receptacles 10. In order that the insects not removed by the brooms or brushes may be dislodged, the arms or fingers 22 are provided, said arms or fingers being held in yielding engagement with the plants, by means of the spring 21 and will effectively dislodge the remaining insects from the plants, after which they may be sprayed through the spray-nozzle 24 with the poison solution carried by the receptacle or tank 6. In the pans or trays 10 may be placed, if desired, a poisonous solution, whereby when the insects are knocked into the same they will be immediately exterminated.

An insect-exterminator constructed as herein shown and described is particularly adapted for destroying the boll-weevil of cotton-plants; but the same may be advantageously used for capturing and destroying all insects which feed upon various kinds of plants.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a machine of the character described, the combination with a supporting-frame adapted to be drawn over the plants, of a tank supported by said frame, insect-receptacles supported beneath said frame, brooms or brushes adjustably mounted on said frame to brush the insects from the plants, means whereby the plants are shaken to dislodge the insects not removed by the brushes, and means whereby the plants are sprayed with the solution in said tank, substantially as described.

2. In a machine of the character described, the combination with a supporting-frame adapted to be drawn over the plants, of a tank supported by said frame, insect-receptacles supported beneath said frame, brooms or brushes adjustably mounted on said frame to brush the insects from the plants, pivotally-mounted plant-shaking arms, means whereby said arms are yieldingly engaged with the plants and a plant-spraying device connected with the tank on said frame, substantially as described.

3. In a machine of the character described, the combination with a supporting-frame adapted to be drawn over the plants, of a tank supported by said frame, insect-receptacles supported beneath said frame, brooms or brushes adjustably mounted on said frame to brush the insects from the plants, pivotally-mounted cranked shafts journaled on said frame, laterally-projecting plant-engaging arms secured to said shafts, an elastic connection between the cranked ends of said shafts to hold said arms in yielding engagement with the plants, and means whereby said plants are sprayed, substantially as described.

4. In a machine of the character described, the combination with a wheeled supporting-frame having suitable draft mechanism connected thereto, of a tank arranged on said frame, a valved discharge-pipe connected with said tank, a spray-nozzle secured to the end of the pipe in position to discharge the contents of the tank on the plants, longitudinally-disposed, parallel, insect-receiving pans suspended below said frame, the forward ends of said pans being flared to facilitate the passage of the plants between the same, brooms or brushes adjustably mounted in said frame, crank-shafts pivotally mounted in the latter, plant-engaging arms secured to said shafts, and a spring to connect the cranked ends of the latter whereby said arms will be held in yielding engagement with the plants, substantially as described.

In testimony whereof I have hereunto set my hand in presence of two subscribing witnesses.

CHARLES L. FERRIOTT.

Witnesses:
J. V. MORRIS,
HARRY FLEICK.